(12) United States Patent
Streitz

(10) Patent No.: US 7,654,621 B2
(45) Date of Patent: Feb. 2, 2010

(54) TRACKED TRAVELING GEAR WITH TWO DRIVE UNITS PER CHAIN

(75) Inventor: Holger Streitz, Ludesch (AT)

(73) Assignee: Liebherr-Werk Nenzing GmbH, Nenzing (AT)

( * ) Notice: Subject to any disclaimer, the term of this patent is extended or adjusted under 35 U.S.C. 154(b) by 103 days.

(21) Appl. No.: 11/821,372

(22) Filed: Jun. 22, 2007

(65) Prior Publication Data

US 2008/0012422 A1   Jan. 17, 2008

(30) Foreign Application Priority Data

Jun. 23, 2006  (DE)  ............... 20 2006 009 862 U

(51) Int. Cl.
    *B62D 55/14*   (2006.01)
(52) U.S. Cl. .................. 305/125; 305/143; 305/153
(58) Field of Classification Search ............... 305/124, 305/125, 143, 145; 180/6.7, 9.62
    See application file for complete search history.

(56) References Cited

U.S. PATENT DOCUMENTS

| | | | | | |
|---|---|---|---|---|---|
| 1,442,550 | A | * | 1/1923 | Wickersham | ............... 180/9.56 |
| 1,942,475 | A | * | 1/1934 | Haines | ........................ 305/153 |
| 2,378,942 | A | * | 6/1945 | Norelius | ..................... 305/130 |
| 3,494,439 | A | * | 2/1970 | Kline | ........................ 180/6.48 |
| 3,511,327 | A | | 5/1970 | Schlör | |
| 3,960,229 | A | * | 6/1976 | Shio | ........................... 180/9.62 |
| 4,068,732 | A | | 1/1978 | Granryd | |
| 4,127,180 | A | | 11/1978 | Coffman | |
| 4,132,279 | A | * | 1/1979 | van der Lende et al. | ...... 180/9.5 |
| 4,470,583 | A | * | 9/1984 | Peiffer et al. | ............. 267/64.26 |
| 4,519,465 | A | | 5/1985 | Triplett | |
| 4,986,377 | A | * | 1/1991 | Moriarty | ..................... 180/6.5 |
| 5,076,378 | A | * | 12/1991 | Lagace | ....................... 180/9.1 |
| 5,515,936 | A | * | 5/1996 | Lagace | ....................... 180/9.1 |
| 5,988,775 | A | * | 11/1999 | Nordberg | ..................... 305/143 |
| 6,158,827 | A | * | 12/2000 | Hostetler | ..................... 305/154 |
| 2002/0007973 | A1 | * | 1/2002 | Lakes | ........................ 180/9.21 |
| 2003/0226697 | A1 | * | 12/2003 | Haringer | ..................... 180/9.1 |

FOREIGN PATENT DOCUMENTS

| | | |
|---|---|---|
| DE | 2484352 | 12/1980 |
| DE | 3610001 | 10/1987 |
| DE | 4021323 | 1/1991 |
| DE | 4335657 | 4/1995 |
| JP | 57007770 A * | 1/1982 |
| JP | 59084676 A * | 5/1984 |
| WO | 2005/097585 | 10/2005 |

* cited by examiner

*Primary Examiner*—Russell D Stormer
(74) *Attorney, Agent, or Firm*—Dilworth & Barrese, LLP.

(57) ABSTRACT

The present invention relates to a tracked traveling gear with two drive units per chain, wherein at least one of the drive units is linearly movable and pretensionable against the traveling gear frame. In an embodiment the drive unit is asymmetrically mounted to a supporting element which is linearly movable and pretensionable against the traveling gear frame. The drive unit includes a tumbler which is laterally detachable and removable from the drive unit while the drive unit is mounted to the travelling gear frame.

19 Claims, 6 Drawing Sheets

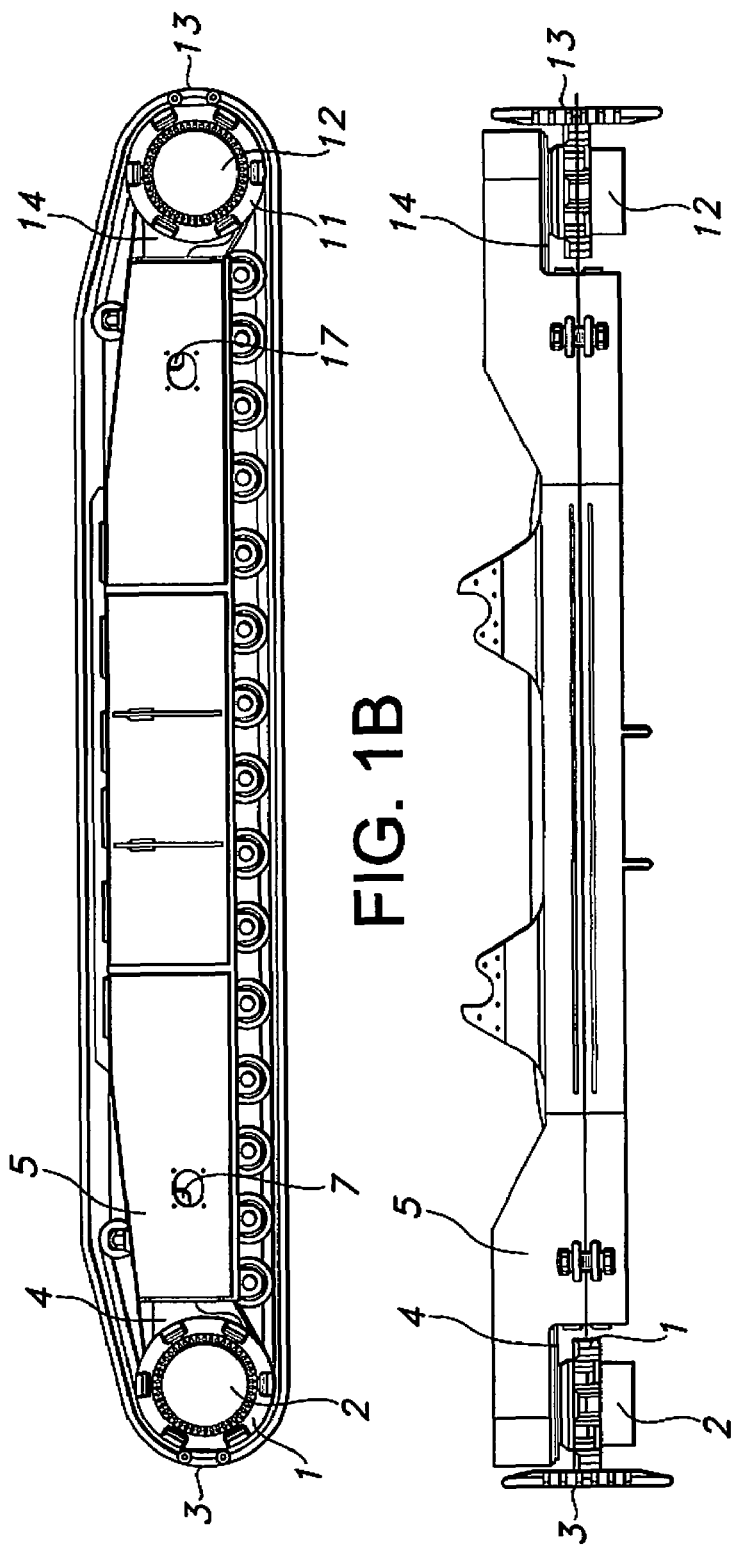

TRACKED TRAVELING GEAR WITH TWO DRIVE UNITS PER CHAIN

BACKGROUND OF THE INVENTION

The present invention relates to a tracked traveling gear with two drive units per chain. Such tracked traveling gears with two drive units per chain are used in particular with crawler cranes, which are intended to move payloads that can no longer be moved when using only one drive unit per chain.

Since the usual chain tension through a pretensioned idler sprocket no longer is possible when using two drive units per chain, because the second drive unit is mounted instead of the idler sprocket, a permanent pretension usually is omitted in the case of tracked traveling gears with two drive units per chain. Due to wear, the chain therefore must be retensioned in certain intervals by inserting spacers, which increases the maintenance costs and maintenance times.

SUMMARY OF THE INVENTION

Therefore, it is the object of the present invention to provide a tracked traveling gear with two drive units per chain, in which the chain is permanently pretensioned.

In accordance with the invention, this object is solved by a tracked traveling gear with the features herein. For this purpose, at least one of the drive units is linearly movable and pretensionable against the traveling gear frame.

As a result of its pretension, the at least one drive unit is linearly shifted against the chain, so that the chain is permanently pretensioned. This provides for a simple and stable pretension of the chain, without requiring any mounting steps for achieving the pretension of the chain. In this way, a safe drive of the chain is ensured at any time in an inexpensive and stable way.

Advantageously, the at least one drive unit substantially is linearly movable in horizontal direction, whereas it cannot move in all other directions, as it is mounted on the traveling gear frame. The movement of the at least one drive unit as a result of the pretension against the chain thus is possible in a simple way, wherein the weight of the vehicle substantially rests on the attachment of the at least one drive unit, which is not movable in vertical direction, and thus does not impair the pretension.

Advantageously, the at least one drive unit is attached to a supporting element which is linearly movable and pretensioned against the traveling gear frame. This particularly involves the advantage that as drive unit a substantially known construction can be used, which is mounted on the supporting element. Only this supporting element must be formed such that it is linearly movable and pretensionable. Such a solution represents a simple and inexpensive construction, in which in particular already existing components can be used.

Advantageously, the at least one drive unit is mounted asymmetrically on the traveling gear frame or supporting element. Mounting the drive unit asymmetrically provides for mounting the tumbler, without having to divide the drive unit, which reduces in particular the maintenance and repair costs. The asymmetric mounting also facilitates the assembly and maintenance of the drive unit itself.

Such asymmetric assembly of the drive unit increases the forces acting on the connection between drive unit and traveling gear frame, which is, however, compensated by the present construction with a merely linearly movable drive unit and in particular with a drive unit which is mounted on a linearly movable supporting element, so that a safe, stable and yet pretensionable construction is obtained.

Furthermore advantageously, both drive units are mounted asymmetrically, so that with both drive units, the tumbler can easily be mounted.

Furthermore advantageously, both drive units have a substantially identical construction, which saves development costs and is also highly advantageous as far as spare parts are concerned. In particular in combination with a linearly movable and pretensionable supporting element, on which the at least one drive unit is mounted, considerable cost advantages are obtained, as the drive unit need only be developed once, or an already known drive unit can be used.

Advantageously, the at least one drive unit furthermore can be pretensioned by a hydraulic cylinder, which can either be effected directly or via a supporting element on which the drive unit is mounted. The hydraulic pretensioning of the drive unit and hence the chain is a simple and inexpensive possibility for specifically pretensioning the chain, as the hydraulic cylinder for tensioning the chain must merely be connected with the pressure source of the vehicle and is then controllable via a valve.

Advantageously, the supporting element, on which the at least one drive unit is mounted and which is linearly movable and pretensionable, comprises a carrier plate.

On this carrier plate, the drive unit can be flange-mounted, for instance, the carrier plate advantageously being disposed vertically on the axis of the drive unit. This provides for a particularly easy assembly of the drive unit, the carrier plate being mounted on the traveling gear frame such that it is linearly movable, in particular linearly movable in horizontal direction, but in all other directions is firmly held by the traveling gear frame.

Advantageously, the drive unit is linearly movable in a guideway against the traveling gear frame. Furthermore advantageously, this guideway is arranged in horizontal direction, so that the drive unit or the supporting element on which the drive unit is mounted is linearly movable in this direction, but otherwise is held by the guideway. This in turn involves the advantage that the weight of the vehicle substantially is supported by the guideway, whereas linear to the guideway merely pretensioning forces are acting.

Advantageously, the guideway consists of protruding elements connected with the traveling gear frame, which engage in a groove of the drive unit or the supporting element. This provides for a safe and reliable attachment of the drive unit, without impairing the movability along the groove.

It is likewise possible, however, that the guideway consists of a groove disposed on a vehicle frame, in which engages an edge of the drive unit or the supporting element, which substantially provides the same advantages.

Advantageously, the side walls of the groove are formed by two plates screwed together, whereby the drive unit or the supporting element can easily be mounted on or demounted from the traveling gear frame.

Advantageously, the supporting element is a telescopable beam. The telescopable beam advantageously forms part of the construction of the traveling gear frame and can be telescoped out of the remaining traveling gear frame and can be pretensioned against the same via a hydraulic cylinder. In this way, a particularly stable construction can be realized in a simple way.

Advantageously, the at least one drive unit is eccentrically screwed to the telescopable beam. In this way, the tumbler can easily be mounted on the drive unit.

The drive units advantageously are hydraulic drives with integrated transmission, which form a compact and stable unit which must be mounted separately and must merely be connected to the pressure source of the vehicle.

BRIEF DESCRIPTION OF THE DRAWINGS

Embodiments of the present invention will now be described in detail with reference to the drawings, in which:

FIG. 1b shows a side view of the first embodiment of the present invention FIG. 1c shows a plan view of the first embodiment of the present invention.

DESCRIPTION OF THE PREFERRED EMBODIMENTS

Figure 1A:
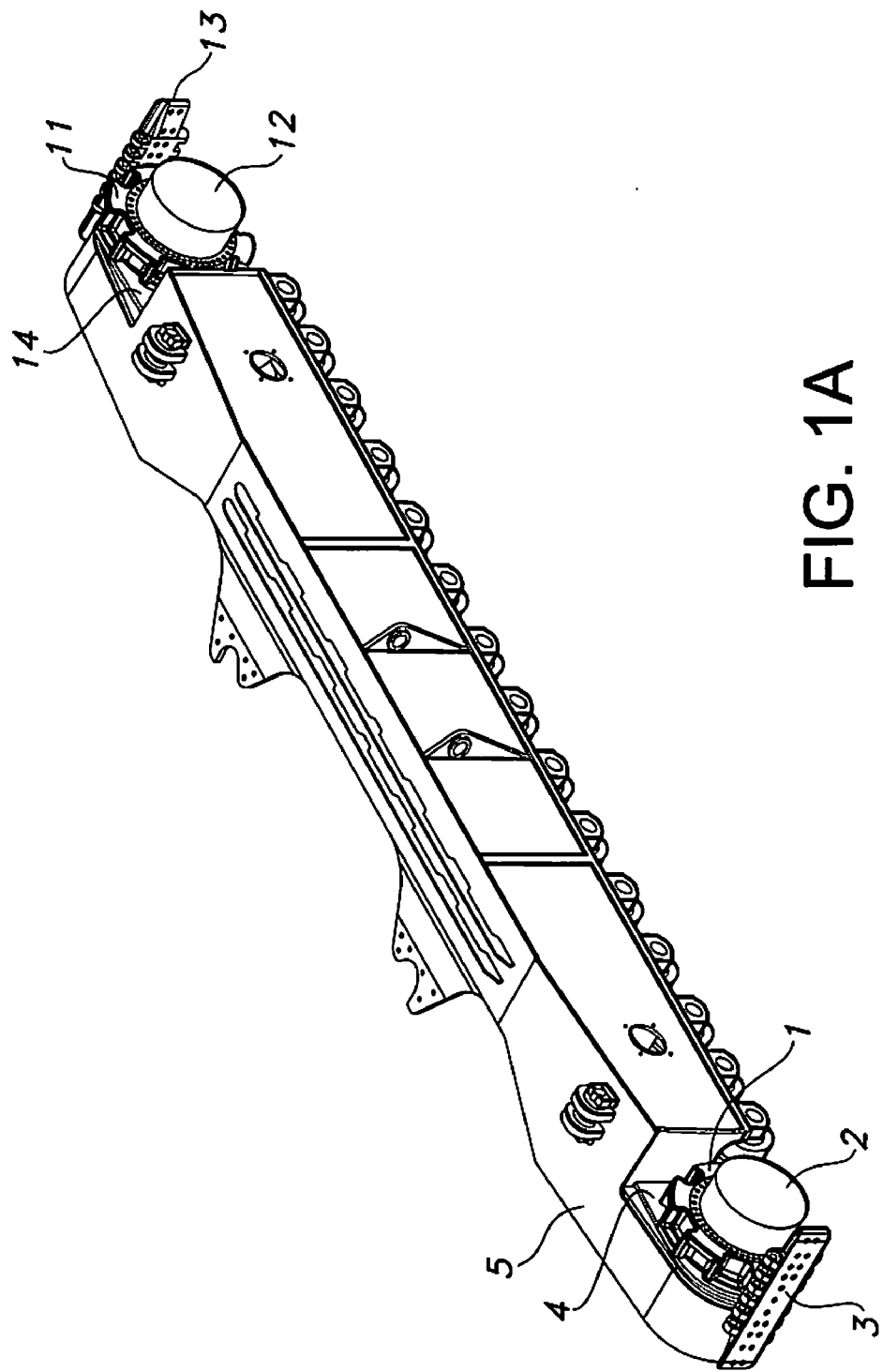
FIG. 1a shows a perspective view of a first embodiment of the present invention.

FIG. 1a shows a first embodiment of the tracked traveling gear of the invention in a perspective view. The tracked traveling gear comprises two drive units 2 and 12, which drive the chain that is merely illustrated by means of the chain links 3 and 13. For tensioning the chain, the drive units 2 and 12 of the first embodiment both are linearly movable and pretensionable against the traveling gear frame 5. For this purpose, the drive units 2 and 12 are flange-mounted asymmetrically on carrier plates 4 and 14, which are horizontally movable against the traveling gear frame. The asymmetric arrangement of the drive units 2 and 12 provides for mounting the tumbler 1 and 11 without removing the drive units 2 and 12.

FIG. 1b shows a side view of the first embodiment. In particular, the carrier plates 4 and 14 can be seen, which are linearly movable and pretensionable against the traveling gear frame and on which the drive units 2 and 12 are mounted. Through recesses in the traveling gear frame 5, parts of the hydraulic cylinders 7 and 17 can be seen, which pretension the carrier plates 4 and 14 against the chain.

FIG. 1c shows a plan view of the first embodiment, which in particular illustrates the asymmetric arrangement of the drive units 2 and 12.

Figure 2:
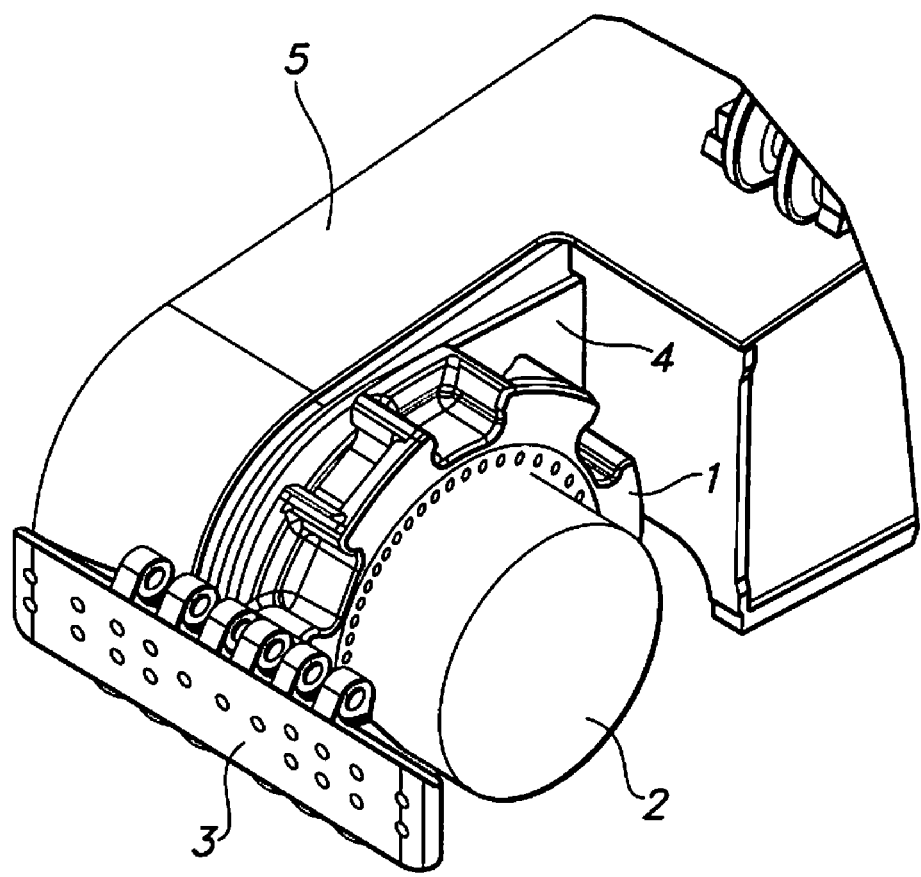
FIG. 2 shows an enlarged perspective view of the first embodiment of the present invention.

FIG. 2 shows an enlarged view of the drive unit 2 of the first embodiment, which is linearly movable and pretensionable against the traveling gear frame. The drive unit 2 is mounted on a carrier plate 4, which in turn is attached to the traveling gear frame 5 so as to be linearly movable in horizontal direction. Since this carrier plate 4 is pretensioned against the traveling gear frame 5, the drive unit 2 mounted on the carrier plate 4 is urged to the outside against the chain 3 and thus permanently tensions the same.

The drive unit 2 comprises a hydraulic motor and an integrated transmission, on which the tumbler 1 is directly mounted. The drive unit 2 is disposed asymmetrically on the traveling gear frame 5. In particular, this involves the advantage that the tumbler 1 can be replaced without having to remove or dismantle the drive unit 2. For this purpose, it is merely necessary to loosen the screws with which the tumbler is flanged to the transmission, so that the tumbler can be withdrawn laterally. Furthermore, a chain link 3 is shown, which is moved by the tumbler 1.

Figure 3:
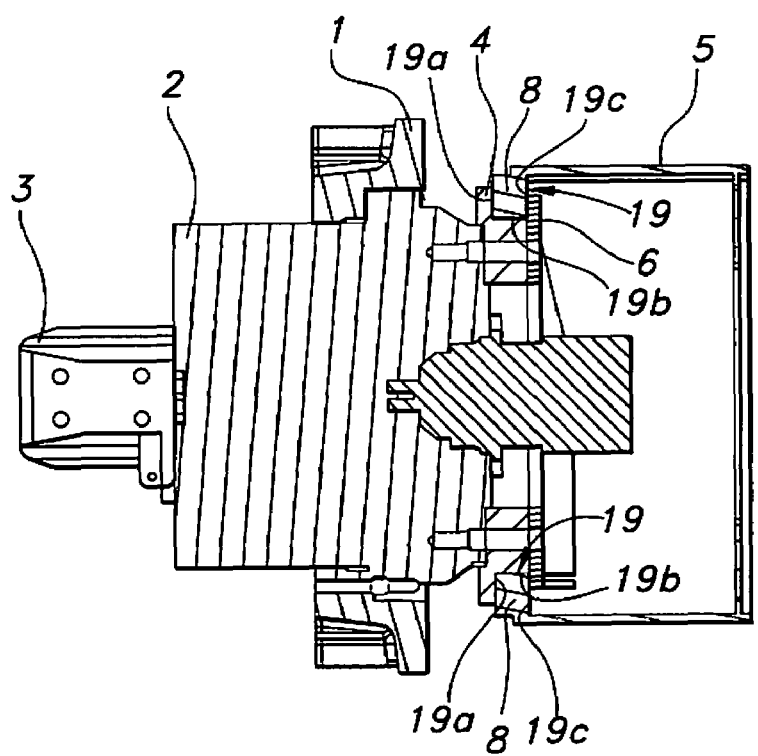
FIG. 3 shows an enlarged sectional view of the first embodiment of the present invention substantially along the axis of the drive unit.

FIG. 3 shows how the carrier plate 4 is linearly movably mounted on the vehicle frame 5. For this purpose, the traveling gear frame 5 includes protruding edges 8, which engage in a groove 19 formed between the carrier plate 4 and an inner plate 6. One side face 19a and the bottom surface 19b of the groove 19 are formed by a recess in the carrier plate 4, whereas the other side face 19c of the groove 19 is formed by the inner plate 6. As a result, the drive unit 2 on the one hand can be mounted very easily. For this purpose, it is screwed both to the inner plate 6 and to the carrier plate 4, whereby the protruding edges 8 of the vehicle frame engage in the groove 19. As a result, the drive unit is mounted on the traveling gear frame in a safe and stable way, as the connection between the vehicle frame 5 and the drive unit 3 carries the entire weight of the vehicle via the protruding edges 8 and the groove 19 between the carrier plate 4 and the inner plate 6. On the other hand, the carrier plate and the drive unit 3 mounted thereon are movable along the groove 19 and thus can be pretensioned against the chain towards the outside.

Figure 4:
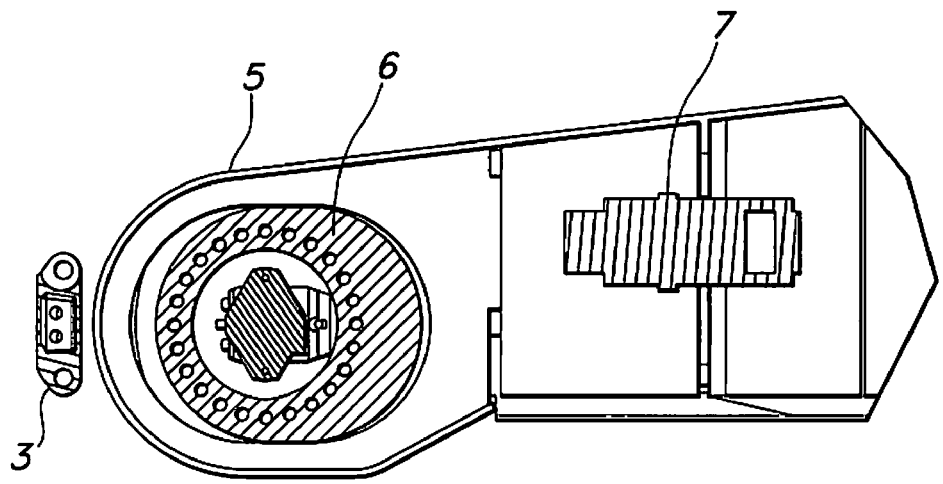
FIG. 4 shows an enlarged sectional view of the first embodiment of the present invention transverse to the axis of the drive unit.
Figure 5:
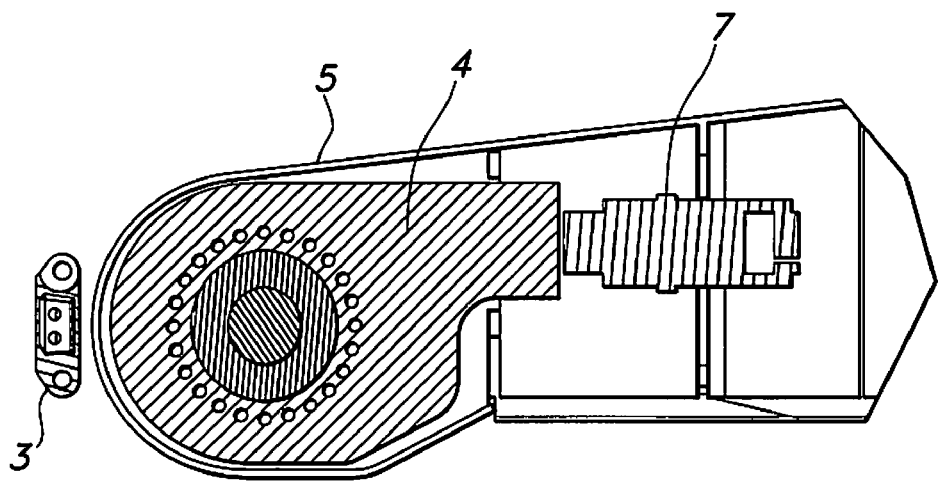
FIG. 5 shows another enlarged sectional view of the embodiment of the present invention transverse to the axis of the drive unit.

FIGS. 4 and 5 show sectional views transverse to the drive axle of the drive unit 3, in which this is clearly illustrated. FIG. 4 in particular illustrates the inner plate 6, which is disposed behind the protruding edges of the traveling gear frame 5. The inner plate 6 thus secures the carrier plate and the drive unit 3 to the vehicle frame 5.

The inner plate 6 includes a large round recess, to provide more space for the drive unit 3. The drive unit 3 can easily be mounted in that it is screwed to the carrier plate 4 and the drive unit 3 via the bores disposed around the recess in the inner plate 6.

FIG. 5 shows the carrier plate 4, which is screwed to the inner plate 6 of the drive unit. Like the inner plate 6, the carrier plate 4 also includes a large round recess, to provide more space for the drive unit 3. The carrier plate 4 additionally includes a projection extending to the right into the traveling gear frame, which can be pretensioned via a hydraulic cylinder 7 firmly mounted on the vehicle frame. Thus, the hydraulic cylinder 7 linearly urges the carrier plate 4 to the outside in the guideway formed by the protruding edges of the vehicle frame 5 and the groove 19 disposed between the inner plate 6 and the carrier plate 4, so that the chain can be pretensioned via the drive unit 3 mounted on the carrier plate 4.

Figure 6:
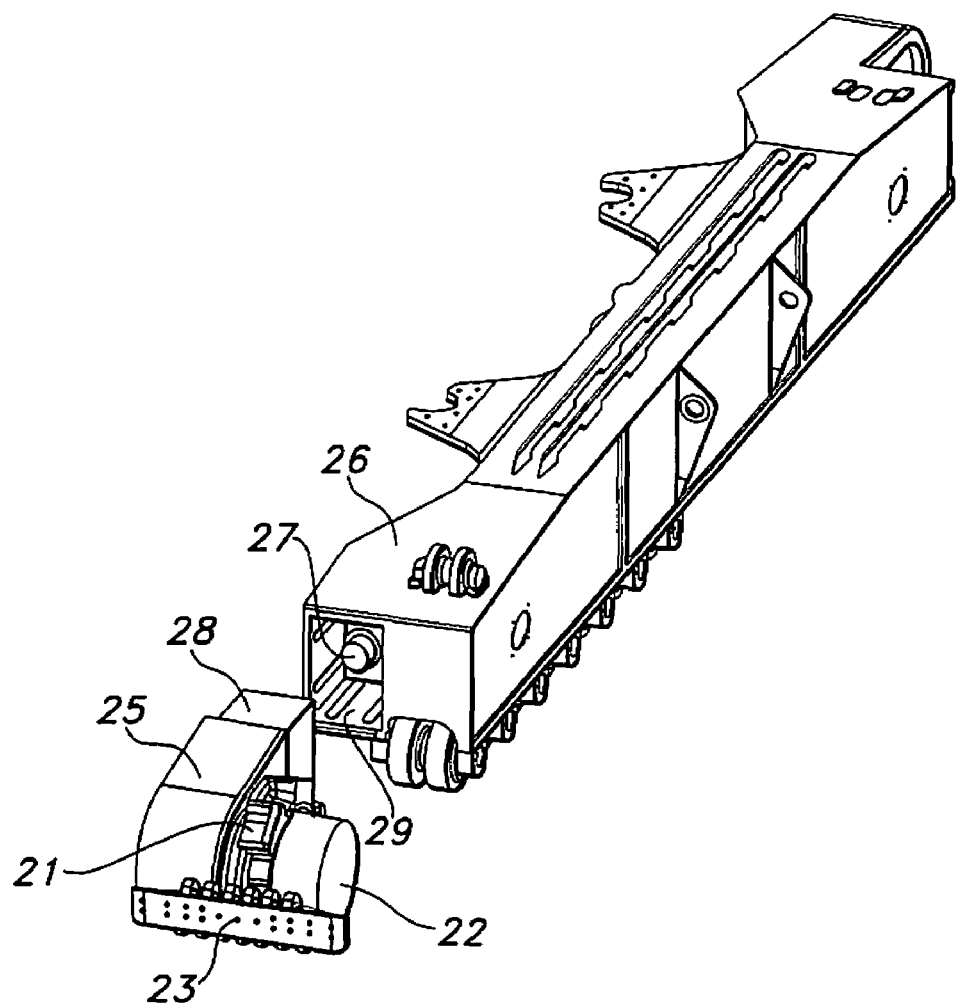
FIG. 6 shows a perspective view of a second embodiment of the present invention.

FIG. 6 shows a second embodiment of the tracked traveling gear of the invention. Here, the drive unit 22 is mounted on a telescopable beam 25. The beam 25 thus forms a front part of the construction of the traveling gear frame, on which the drive unit 22 is mounted asymmetrically. As a result, the tumbler 21 can in turn be mounted more easily. The beam 25 includes a telescopic element 28, which is linearly movably guided in a corresponding seat 29 in the traveling gear frame 26. For better clarity, the telescopable beam with the telescopic element 28 was shown completely withdrawn from the seat 29 in the present perspective drawing. During operation, the telescopic element 28 is disposed in the seat 29 and is retained by the same at the top and at the bottom and at the sides. The accommodation of the telescopic element 28 in the seat 29 thus carries the weight of the vehicle. The piston of the hydraulic cylinder 27 protrudes into the seat 29, so that the beam 28 can be telescoped out and pretensioned against the chain 23 by applying pressure onto the hydraulic cylinder 27.

Thus, a stable construction of the traveling gear is also obtained in the second embodiment, which provides for automatically pretensioning the chain also when using two drive units per chain. In the second embodiment, the second drive unit is firmly mounted on the traveling gear frame, other than in the first embodiment, the representation of this second firmly mounted drive unit having been omitted, however, in FIG. 6.

The invention claimed is:

1. A tracked traveling gear with two drive units per chain, wherein at least one of the drive units is linearly movable and pretensionable against the traveling gear frame, said drive unit being asymmetrically mounted to a supporting element which is linearly movable and pretensionable against the traveling frame, and said drive unit having a tumbler associated therewith, said tumbler being laterally detachable and removable from the drive unit while the drive unit is mounted to the traveling gear frame.

2. The tracked traveling gear according to claim 1, wherein the at least one drive unit is attached to a supporting element which is linearly movable and pretensionable against the traveling gear frame.

3. The tracked traveling gear according to claim 2, wherein the supporting element comprises a carrier plate.

4. The tracked traveling gear according to claim 2, wherein the supporting element comprises a telescopable beam.

5. The tracked traveling gear according to claim 4, wherein the at least one drive unit is eccentrically mounted to the telescopable beam.

6. The tracked traveling gear according to claim 2, wherein the at least one drive unit is asymmetrically mounted on the traveling gear frame or supporting element.

7. The tracked traveling gear according to claim 6, wherein both drive units are mounted asymmetrically.

8. The tracked traveling gear according to claim 2, wherein both drive units are mounted asymmetrically.

9. The tracked traveling gear according to claim 2, wherein both drive units substantially have an identical construction.

10. The tracked traveling gear according to claim 1, wherein both drive units are mounted asymmetrically.

11. The tracked traveling gear according to claim 1, wherein both drive units substantially have an identical construction.

12. The tracked traveling gear according to claim 1, wherein the at least one drive unit is pretensionable by a hydraulic cylinder.

13. The tracked traveling gear according to claim 1, wherein the drive unit is linearly movable in a guideway against the traveling gear frame.

14. The tracked traveling gear according to claim 13, wherein the guideway is composed of protruding elements connected with the traveling gear frame, which engage in a groove of the drive unit or of the supporting element.

15. The tracked traveling gear according to claim 14, wherein the side walls of the groove are formed by two plates screwed together.

16. The tracked traveling gear according to claim 13, wherein the guideway is composed of a groove disposed on the traveling gear frame, in which engages an edge of the drive unit or of the supporting element.

17. The tracked traveling gear according to claim 16, wherein the side walls of the groove are formed by two plates screwed together.

18. The tracked traveling gear according to claim 1, wherein both drive units are mounted asymmetrically.

19. The tracked traveling gear according to claim 1, wherein both drive units substantially have an identical construction.

* * * * *